United States Patent
Chino et al.

(10) Patent No.: US 11,190,713 B2
(45) Date of Patent: Nov. 30, 2021

(54) IMAGE PROCESSING APPARATUS AND METHOD, AND IMAGING APPARATUS

(71) Applicant: CANON KABUSHIKI KAISHA, Tokyo (JP)

(72) Inventors: Shunsuke Chino, Wako (JP); Mitsuhiro Ono, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/894,087

(22) Filed: Jun. 5, 2020

(65) Prior Publication Data
US 2020/0389607 A1 Dec. 10, 2020

(30) Foreign Application Priority Data
Jun. 6, 2019 (JP) .............................. JP2019-106511

(51) Int. Cl.
*H04N 5/33* (2006.01)
*H04N 5/225* (2006.01)

(52) U.S. Cl.
CPC ........... *H04N 5/332* (2013.01); *H04N 5/2258* (2013.01)

(58) Field of Classification Search
CPC ......... H04N 5/332; H04N 5/2258; H04N 9/77
See application file for complete search history.

(56) References Cited

U.S. PATENT DOCUMENTS

| | | | |
|---|---|---|---|
| 2015/0312541 A1* | 10/2015 | Usui | H04N 9/0451 348/164 |
| 2017/0039411 A1* | 2/2017 | Ono | G06K 9/00255 |
| 2019/0045139 A1* | 2/2019 | Kurata | H04N 5/232 |

FOREIGN PATENT DOCUMENTS

JP 2013-255144 A 12/2013

* cited by examiner

*Primary Examiner* — Ahmed A Berhan
(74) *Attorney, Agent, or Firm* — Cowan, Liebowitz & Latman, P.C.

(57) ABSTRACT

An image processing apparatus obtains a visible light image and an infrared light image, and generates a color component of a composite image using a color component of the visible light image, and generates a luminance component of the composite image using luminance components of the infrared light image and the visible light image. The image processing apparatus corrects the color component or the luminance component of the composite image, using a correction coefficient determined based on the color component of the visible light image.

13 Claims, 7 Drawing Sheets

| HUE | CORRECTION COEFFICIENT($\beta_1$) |
|---|---|
| 0 (YELLOW) | 0.7 |
| 1 (RED) | 2.0 |
| 2 (VIOLET) | 3.3 |
| 3 (BLUE) | 2.5 |
| 4 (DARK-GREEN) | 0.8 |
| 5 (GREEN) | 0.6 |

| SATURATION | CORRECTION COEFFICIENT($\gamma_1$) |
|---|---|
| 1 | 5.0 |
| 2 | 4.0 |
| 3 | 3.0 |
| 4 | 2.0 |
| 5 | 1.0 |

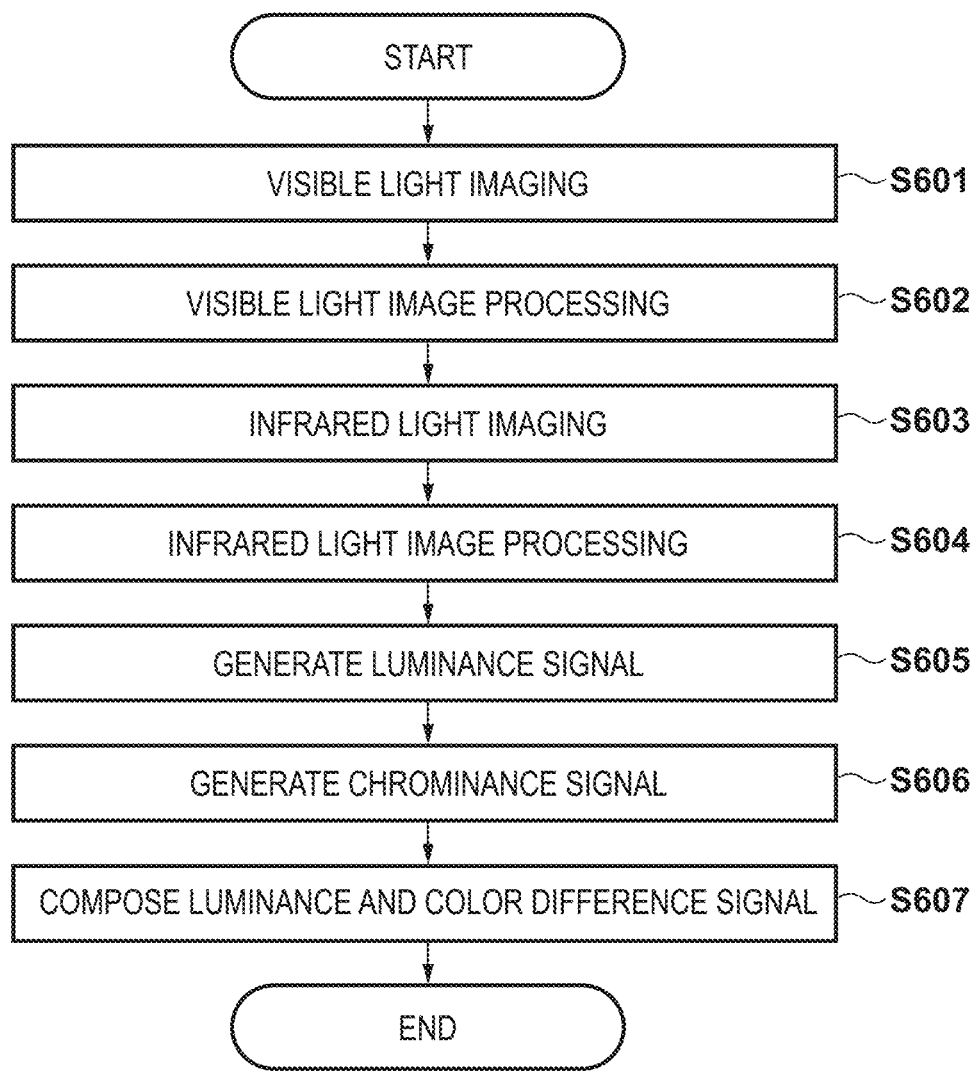

FIG. 7A

| HUE | CORRECTION COEFFICIENT($\beta_2$) |
|---|---|
| 0 (YELLOW) | 1.2 |
| 1 (RED) | 0.5 |
| 2 (VIOLET) | 0.4 |
| 3 (BLUE) | 0.5 |
| 4 (DARK-GREEN) | 1.1 |
| 5 (GREEN) | 1.2 |

FIG. 7B

| SATURATION | CORRECTION COEFFICIENT($\gamma_2$) |
|---|---|
| 1 | 1.0 |
| 2 | 1.1 |
| 3 | 1.2 |
| 4 | 1.3 |
| 5 | 1.4 |

IMAGE PROCESSING APPARATUS AND METHOD, AND IMAGING APPARATUS

BACKGROUND OF THE INVENTION

Field of the Invention

The present invention relates to an image processing apparatus and a method, and an imaging apparatus.

Description of the Related Art

Conventionally, there is known an imaging apparatus configured to enable visible light imaging and infrared light imaging. Japanese Patent Laid-Open No. 2013-255144 (hereinafter, Literature 1) proposes an imaging apparatus that uses an imaging element, which is sensitive to a visible light component and an infrared light component, to generate a luminance signal based on the visible light component and the infrared light component, generate chrominance signals based on the visible light component, and output the luminance signal and a chrominance signal with an increased gain.

The technique disclosed in Literature 1 controls gain (saturation) of the chrominance signal using the luminance signal. However, Literature 1 does not take into account that, when composing a visible light image and an infrared light image to generate a luminance signal, the amount of luminance variation may differ depending on the color. Thus, saturation may become too high or too low with respect to the luminance signal depending on the color, which makes it impossible to obtain an image appropriately composed from a luminance signal and a chrominance signal.

SUMMARY OF THE INVENTION

The present invention provides a technique for generating, from a visible light image and an infrared light image, a composite image with an appropriate color representation.

According to one aspect of the present invention, there is provided an image processing apparatus comprising: at least one processor and/or circuit configured to function as: an obtaining unit configured to obtain a visible light image and an infrared light image; and a composition unit configured to generate a color component of a composite image using a color component of the visible light image, and generate a luminance component of the composite image using luminance components of the infrared light image and the visible light image, wherein the composition unit corrects the color component or the luminance component of the composite image, using a correction coefficient determined based on the color component of the visible light image.

According to another aspect of the present invention, there is provided an image processing method comprising: obtaining a visible light image and an infrared light image; and generating a color component of a composite image using a color component of the visible light image, and generating a luminance component of the composite image using luminance components of the infrared light image and the visible light image, wherein the color component or the luminance component of the composite image is corrected using a correction coefficient determined based on the color component of the visible light image.

According to another aspect of the present invention, there is provided a non-transitory computer-readable storage medium storing a program for causing a computer to perform an image processing method, the image processing method comprising: obtaining a visible light image and an infrared light image; and generating a color component of a composite image using a color component of the visible light image, and generating a luminance component of the composite image using luminance components of the infrared light image and the visible light image, wherein the color component or the luminance component of the composite image is corrected using a correction coefficient determined based on the color component of the visible light image.

Further features of the present invention will become apparent from the following description of exemplary embodiments with reference to the attached drawings.

BRIEF DESCRIPTION OF THE DRAWINGS

FIG. 6 is a flowchart illustrating a process performed by an image processing unit according to the first embodiment.

FIGS. 7A and 7B illustrate an example of a correction data table according to a second embodiment.

DESCRIPTION OF THE EMBODIMENTS

Figure 1:
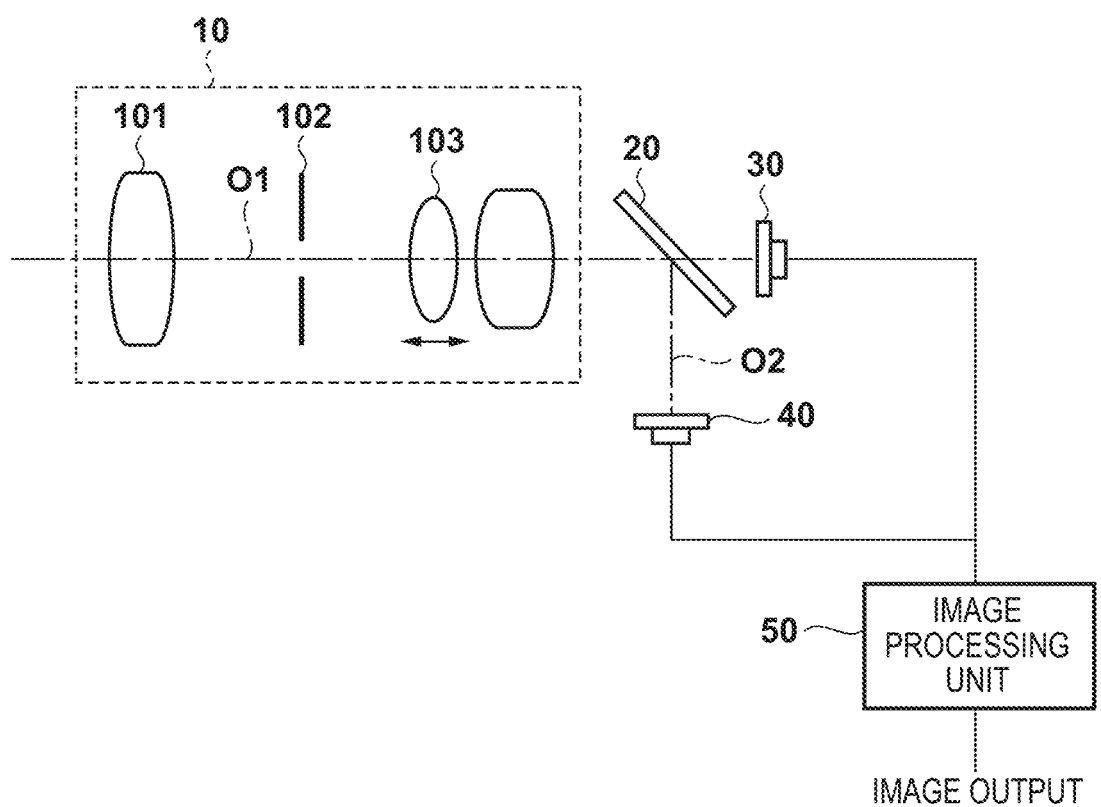
FIG. 1 is a block diagram illustrating a configuration example of an imaging apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Configuration of Imaging Apparatus

An overall configuration of an imaging apparatus according to a first embodiment will be described, referring to FIG. 1. FIG. 1 is a block diagram illustrating a configuration example of a digital camera, which is an imaging apparatus according to the first embodiment. In a lens group 10, an objective lens 101, a diaphragm 102, and a focus lens 103 are sequentially arranged along an optical axis O1. Behind the lens group 10 is provided a dichroic mirror 20 for wavelength separation. The dichroic mirror 20 transmits visible light components and reflects infrared light components. Visible light components having passed through the dichroic mirror 20 are photoelectrically converted into an image by a visible light imaging element 30 provided behind the dichroic mirror 20. On the other hand, infrared light components reflected by the dichroic mirror 20 pass through an optical axis O2, and photoelectrically converted into an image by an infrared light imaging element 40. An image processing unit 50 composes a visible light signal (image) from the visible light imaging element 30 and an infrared light signal (image) output the infrared light imaging element 40, then generates and outputs a composite image.

The visible light imaging element 30 and the infrared light imaging element 40 are provided at a generally conjugate position. However, in order to absorb the shift of in-focus position due to wavelength difference, the infrared light imaging element 40 may be provided at a position shifted from the conjugated position on the optical path. In addition, although the first embodiment is configured to separate visible light components and infrared light components by the dichroic mirror 20, the present invention is not limited thereto. For example, there may be a configuration that captures an image with an unillustrated infrared cut filter (IRCF) being inserted and removed in time series, or a configuration that captures visible light images and infrared light images by separate cameras (imaging elements), respectively. In other words, any configuration that can obtain visible light images and infrared light images may be used, without being limited to any specific architecture. Furthermore, the infrared light image may include only infrared light components, or may include both visible light components and infrared light components.

The aforementioned configuration of the imaging apparatus allows for capturing, simultaneously and at a same angle of view, a visible light image generated from visible light components and an infrared light image generated from infrared light components.

Configuration of Image Processing Unit 50

Figure 2:
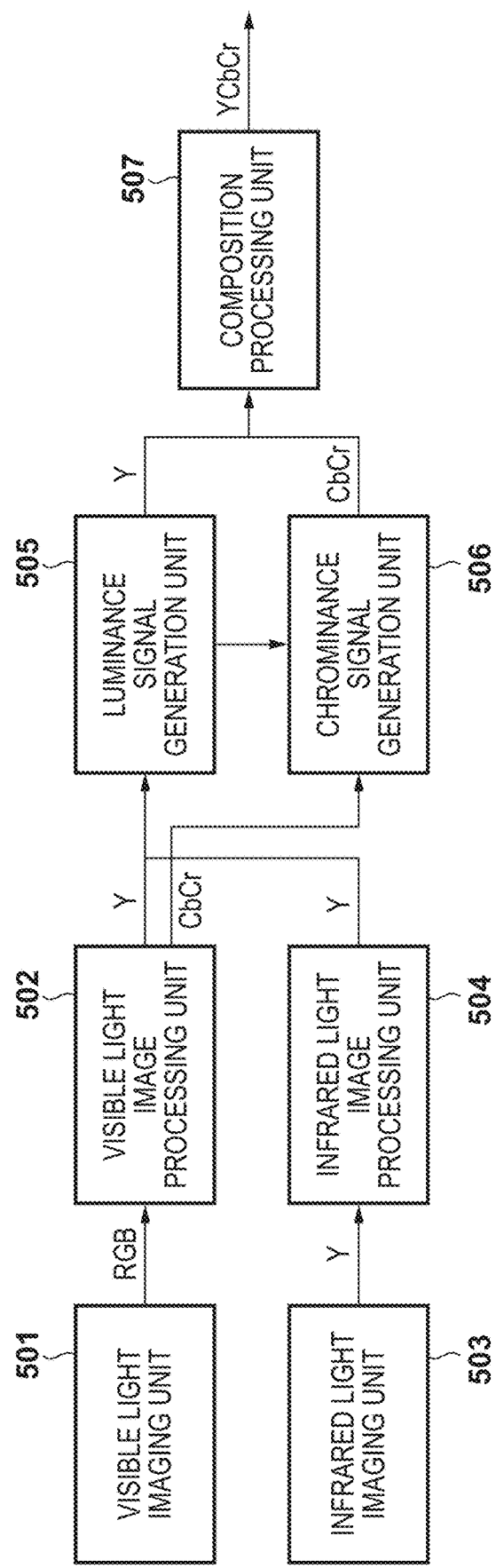
FIG. 2 is a block diagram illustrating functional configuration example of the image processing unit according to the first embodiment.

Next, the image processing unit 50 will be described, referring to FIG. 2. FIG. 2 is a block diagram illustrating a functional configuration example of the image processing unit 50 according to the first embodiment. A visible light imaging unit 501 converts a visible light signal output from the visible light imaging element 30 into an RGB signal, and generates a visible light image. After having performed image processing such as γ-correction or color-space conversion on the RGB signal, the visible light image processing unit 502 converts the processed RGB signal into a visible light image formed of a luminance signal Y and a chrominance signal CbCr, and outputs the converted image. In addition, the infrared light signal output from the infrared light imaging element 40 is converted into an image formed of only the Y-signal and output by an infrared light imaging unit 503 as a monochrome image. An infrared light image processing unit 504 performs image processing such as γ-correction on the Y-signal, whereby infrared light generates an image. The visible light imaging unit 501, the visible light image processing unit 502, the infrared light imaging unit 503, and the infrared light image processing unit 504 described above present an example of configuration for obtaining visible light images and infrared light images.

A chrominance signal generation unit 506 generates a color component of the composite image using the color component of the visible light image. A luminance signal generation unit 505 generates a luminance component of the composite image using the luminance components of the infrared light image and the visible light image. A composition processing unit 507 outputs the color component generated in the chrominance signal generation unit 506 and the luminance component generated in the luminance signal generation unit 505 as the composite image. Here, the chrominance signal generation unit 506 corrects a color component of the composite image using a correction coefficient determined based on the color component of the visible light image. In the following, the luminance signal generation unit 505, the chrominance signal generation unit 506, and the composition processing unit 507 will be described in more detail.

Figures 5A, 5B, 5C:
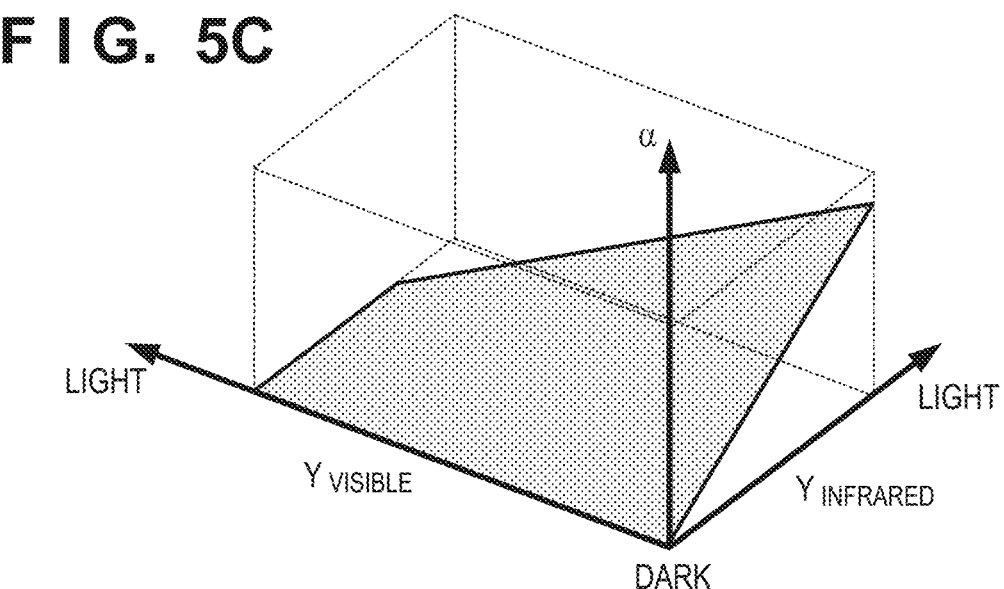
FIGS. 5A and 5B illustrate an example of a correction data table according to the first embodiment.
FIG. 5C illustrates a composition ratio of luminance signals.

The luminance signal generation unit 505 composes the visible light image generated in the visible light image processing unit 502 and the infrared light image generated in the infrared light image processing unit 504, and generates a luminance signal. Here, the luminance signal is calculated by the following Formula 1, for example. According to Formula 1, the luminance signal $Y_{visible}$ of the visible light image and the luminance signal $Y_{infrared}$ of the infrared light image are α-blended. Here, $\alpha_1$, indicating the blend coefficient, is illustrated in FIG. 5C. As illustrated in FIG. 5C, the composition ratio $\alpha_1$ decreases when the visible light image is bright, emphasizing the luminance signal of the visible light image. When, on the other hand, when the visible light image is dark, the composition ratio $\alpha_1$ varies in accordance with the luminance signal of the infrared light image.

$$Y_{composite} = \alpha_1 \times Y_{infrared} + (1-\alpha_1) \times Y_{visible} \quad \text{Formula 1}$$

$Y_{composite}$: composed luminance signal
$Y_{visible}$: luminance signal of visible light image
$Y_{infrared}$: luminance signal of infrared light image
$\alpha_1$: composition ratio of infrared light image The chrominance signal generation unit 506 corrects the chrominance signal generated in the visible light image processing unit 502 according to at least one of: hue and saturation indicated by the chrominance signal; and the composition ratio $\alpha_1$ used in the luminance signal generation unit 505. In this embodiment, saturation is corrected. Here, as an example, correction amount is calculated according to the following Formula 2. In Formula 2, saturation is adjusted by multiplying the difference between luminance signals $(Y_{infrared} - Y_{visible})$ by a hue-dependent correction coefficient $\beta_1$ and a saturation-dependent correction coefficient $\gamma_1$.

$$C_{composite} = \beta_1 \times \gamma_1 \times \alpha_1 \times (Y_{infrared} - Y_{visible}) \times C_{visible} \quad \text{Formula 2}$$

$C_{composite}$: composed chrominance signal (saturation)
$C_{visible}$: chrominance signal (saturation) of visible light image
$Y_{infrared}$: luminance signal of infrared light image
$Y_{visible}$: luminance signal of visible light image
$\alpha_1$: composition ratio of infrared light image
$\beta_1$: correction coefficient in accordance with hue
$\gamma_1$: correction coefficient in accordance with saturation In addition, although Formula 2 adjusts saturation by multiplying the difference between the luminance signal of the infrared light image and the luminance signal of the visible light image $(Y_{infrared} - Y_{visible})$ by the coefficients $\beta_1$ and $\gamma_1$, adjustment is not limited thereto. For example, $C_{composition}$ may be corrected according to a ratio $(Y_{infrared}/Y_{visible})$ of the luminance signal of an infrared light image relative to the luminance signal of a visible light image as in Formula 3 described below, in accordance with the property of color filter, or the like. In other words, a correction coefficient which becomes larger for a larger difference or ratio between the luminance of the corrected visible light image and the luminance of the infrared light image may be used to correct saturation of the composite image.

$$C_{composite} = \beta_1 \times \gamma_1 \times \alpha_1 \times (Y_{infrared}/Y_{visible}) \times C_{visible} \quad \text{Formula 3}$$

Figure 3:
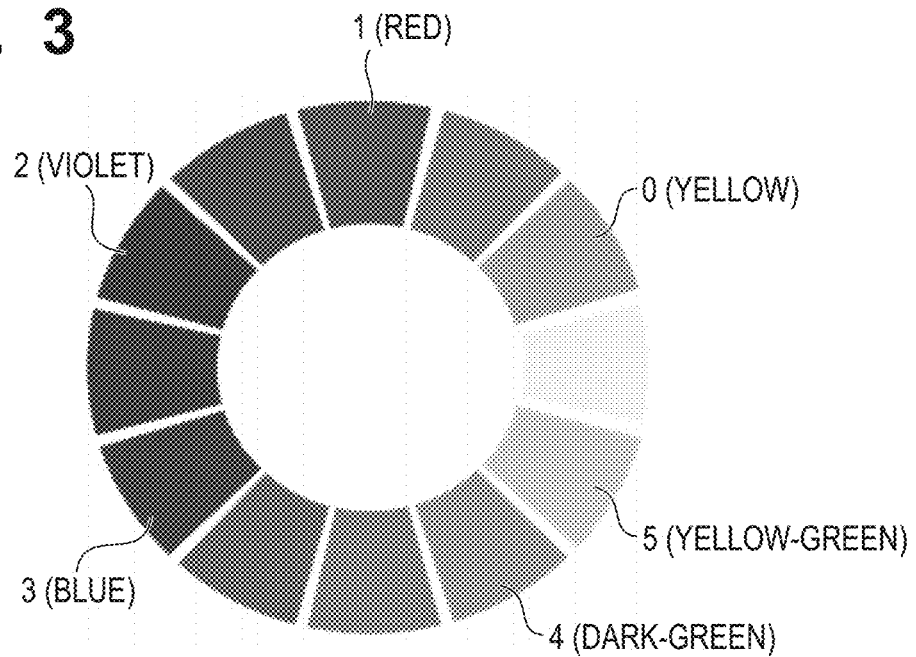
FIG. 3 illustrates a hue circle.
Figure 4A:
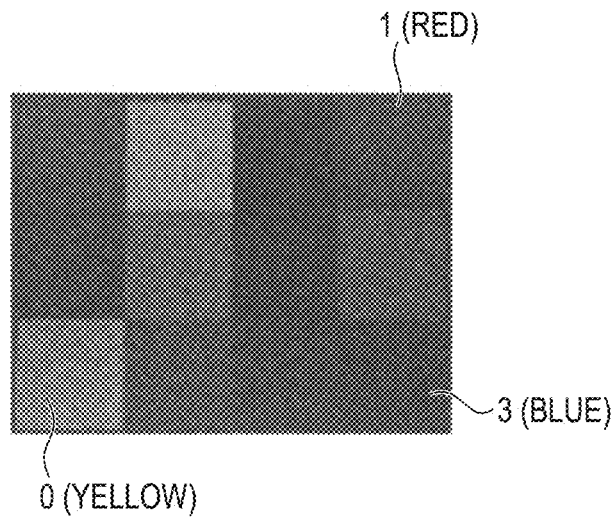
FIG. 4A illustrates an example of a visible light image captured of a color chart.
Figure 4B:
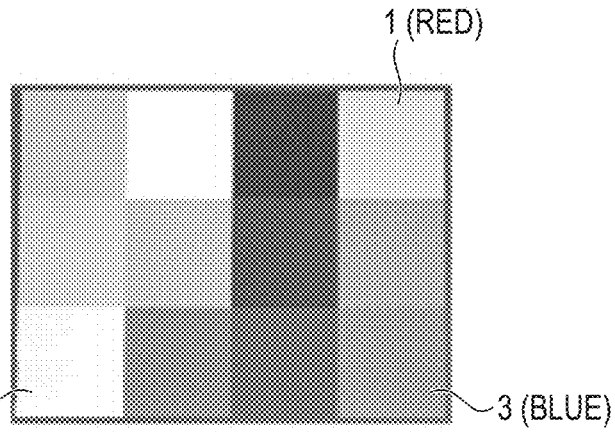
FIG. 4B illustrates an example of an infrared light image captured of the color chart.

The correction coefficients $\beta_1$ and $\gamma_1$ described above will be described, referring to FIG. 3 to FIG. 5C. FIG. 3 illustrates a hue circle. In the drawing, hue varies from red, violet, blue, dark-green, to yellow-green in ascending order of numbers, with zero indicating yellow. FIG. 4A is a visible light image captured of a color chart, and FIG. 4B is an infrared light image captured of the color chart. As can be seen from FIGS. 4A and 4B, infrared components exhibit a significantly increased luminance of red and blue in comparison with visible light components. With regard to blue, visible light components exhibit a low luminance due to influence of the color filter of the sensor, whereas infrared components have a smaller difference of sensitivity from other GR components due to the filter and exhibits an increased luminance relative to other colors. In addition, with regard to red, the R-component filter tends to also absorb a substantial amount of near-infrared components due to the property of the color filter, and thus infrared light components exhibits a significantly increased luminance in comparison with visible light components.

FIG. 5A illustrates an example of a correction data table holding correction coefficients $\beta_1$ in accordance with hue. The correction data table has, in the form of a table, correction coefficients of saturation for each hue illustrated in FIG. 3. Note that the correction coefficient between hues held in the table (e.g., between hue 0 (yellow) and hue 1 (red)) may be calculated by linear interpolation or the like. As described above, characteristically, the correction coefficient $\beta_1$ has increased for red, blue and purple, which are susceptible to enhancement of the luminance signal due to the infrared light component. In other words, the correction coefficient $\beta_1$ becomes larger for a hue with a larger proportion of red or blue components compared to green components.

Additionally, in a state where a large gain is applied due to low illuminance, excessively correcting the saturation using $\alpha_1$ and $\beta_1$ may result in excessively emphasizing color noise. Thus, it is preferred to set a limit on the correction amount depending on gain. In addition, with regard to saturation, the effect due to enhancement of the luminance signal decreases for a sufficiently high saturation, and raising the saturation in accordance with the luminance signal may overfill the RGB component, which may result in distortion of hue. Therefore, it is preferable to change the correction coefficient in accordance with the height of the saturation. An example of a correction data table holding the correction coefficient $\gamma_1$ in accordance with saturation is illustrated in FIG. 5B. The correction coefficient $\gamma_1$ becomes smaller for a higher saturation of the visible light image. In addition, overfill may be prevented by setting a limit on the correction amount in accordance with saturation (for example, reduce the saturation correction amount to a predetermined value or less when the saturation becomes higher than the predetermined value), instead of the method of changing the correction coefficient.

The composition processing unit 507 composes the luminance signal from the luminance signal generation unit 505 and the chrominance signal from the chrominance signal generation unit 506, and outputs the composed signal as the composite image. Note that, although YCbCr is used as the color space in the present embodiment, this is not limiting and other color spaces such as RGB or YUV may be used.

Operation of Image Processing Unit 50

An operation of the image processing unit 50 according to the first embodiment configured as described above will be described, referring to the flowchart of FIG. 6. At S601, the visible light imaging unit 501 converts the visible light signal from the visible light imaging element 30 into an RGB signal to obtain a visible light image (visible light imaging). At S602, the visible light image processing unit 502, after having performed image processing such as γ-correction or color-space conversion on the visible light image (RGB signal) obtained at S601, converts the processed image into a visible light image including the luminance signal Y and the chrominance signal CbCr, and outputs the converted image.

At S603, the infrared light imaging unit 503 obtains an infrared light image (infrared light imaging) including only the luminance signal Y based on the image from the infrared light imaging element 40. At S604, the infrared light image processing unit 504, after having performed image processing such as γ-correction on the infrared light image obtained at S603, outputs an infrared light image including the luminance signal Y. Here, obtaining the visible light image at steps S601 to S602 and obtaining the infrared light image at steps S603 to S604 may be performed in parallel, or obtaining the infrared light image may be performed first.

At S605, the luminance signal generation unit 505 composes the visible light image generated in the visible light image processing unit 502 and the infrared light image generated in the infrared light image processing unit 504 using Formula 1, and generates a luminance signal of the composite image. At S606, the chrominance signal generation unit 506 uses the chrominance signal of the visible light image generated in the visible light image processing unit 502 as the chrominance signal of the composite image. On this occasion, the chrominance signal generation unit 506 corrects the saturation obtained from the chrominance signal of the visible light image in accordance with at least one of: hue and saturation obtained from the chrominance signal; and the composition ratio $\alpha_1$ used in the luminance signal generation unit 505. In the present embodiment, saturation is corrected using Formula 2 or Formula 3. From the chrominance signal, a chrominance signal of the composite image is generated using the hue and the corrected saturation.

Note that, in a state where a large gain is applied due to low illuminance, largely correcting the saturation may result in emphasizing color noise. In addition, raising the saturation in accordance with the luminance signal in a high-saturation state may overfill the RGB component, which may result in distortion of hue. Therefore, at S606, the chrominance signal generation unit 506 may set a limit on the amount of saturation correction depending on gain. Subsequently, at S607, the composition processing unit 507 composes the luminance signal from the luminance signal generation unit 505 and the chrominance signal from the chrominance signal generation unit 506, and outputs the composed signal as the composite image.

According to the first embodiment, as has been described above, it is possible to generate a composite image of a visible light image and an infrared light image with an appropriate color representation.

Second Embodiment

In the first embodiment, there has been described a configuration for correcting the chrominance signal (saturation) in accordance with hue and saturation. In a second embodiment, there will be described a configuration for correcting the luminance signal in accordance with hue and saturation. The configuration of the imaging apparatus according to the second embodiment is similar to that of the first embodiment (FIG. 1). In addition, the functional configuration of the image processing unit 50 is also similar to that of the first embodiment (FIG. 2). However, the luminance signal generation unit 505 of the second embodiment obtains the chrominance signal CbCr from the chrominance signal generation unit 506, and corrects the luminance signal of the composite image using a correction coefficient corresponding to the brightness and the saturation obtained from the chrominance signal.

The correction process of the luminance signal by the luminance signal generation unit 505 will be described in more detail. The luminance signal generation unit 505 composes, by alpha blending, the luminance signal $Y_{visible}$ of the visible light image obtained from the visible light image processing unit 502 and the luminance signal $Y_{infrared}$ of the infrared light image obtained from the infrared light image processing unit 504, and generates a luminance signal of the composite image. When performing the aforementioned composition, the luminance signal generation unit 505 calculates the composed luminance signal as indicated by the following Formula 4, in accordance with the chrominance information obtained from the chrominance signal generation unit 506.

$$Y_{composite} = \beta_2 \times \gamma_2 \times (\alpha_2 \times Y_{infrared} + (1-\alpha_2) \times Y_{visible}) \quad \text{Formula 4}$$

$Y_{composite}$: composed brightness signal
$Y_{visible}$: luminance signal of visible light image
$Y_{infrared}$: luminance signal of infrared light image
$\alpha_2$: composition ratio of infrared light image
$\beta_2$: correction coefficient in response to hue
$\gamma_2$: correction coefficient in accordance with saturation FIG. 7A illustrates a correction data table holding the correction coefficient $\beta_2$ that varies in accordance with hue. In addition, FIG. 7B illustrates a correction data table holding the correction coefficient $\gamma_2$ that varies in accordance with saturation. The luminance correction coefficients $\beta_2$ and $\gamma_2$ for each hue and saturation are held in a form of a table.

As has been described referring to FIGS. 4A and 4B, it turns out that luminance of red and blue in the infrared component significantly increases in comparison with the visible light component. Therefore, in order to suppress excessive increase of luminance of red and blue, it is possible to reduce the correction coefficient for red and blue, and increase the correction coefficient for yellow and green so as to adjust the luminance signal to be optimal for the chrominance signal. Therefore, as illustrated in FIG. 7A, the correction coefficient $\beta_2$ is used, which becomes larger for a hue with a larger proportion of green components than red or blue components. In addition, as illustrated in FIG. 7B, the higher the saturation rises, the larger the correction coefficient $\gamma_2$ becomes.

Additionally, in a state where a large gain is applied due to low illuminance, excessively correcting the luminance using $\alpha_2$, $\beta_2$ and $\gamma_2$ may result in excessively emphasizing luminance noise. Thus, a limit may be set on the correction amount depending on the gain at the time of imaging.

The chrominance signal generation unit 506 outputs the chrominance signal generated in the visible light image processing unit 502 to the composition processing unit 507. The composition processing unit 507 composes the luminance signal from the luminance signal generation unit 505 and the chrominance signal from the chrominance signal generation unit 506, and outputs the composed signal as the composite image. Note that the color space is not limited to YCbCr, similarly to the first embodiment, and other color spaces such as RGB or YUV may be used.

Operation of Image Processing Unit 50

Figure 8:
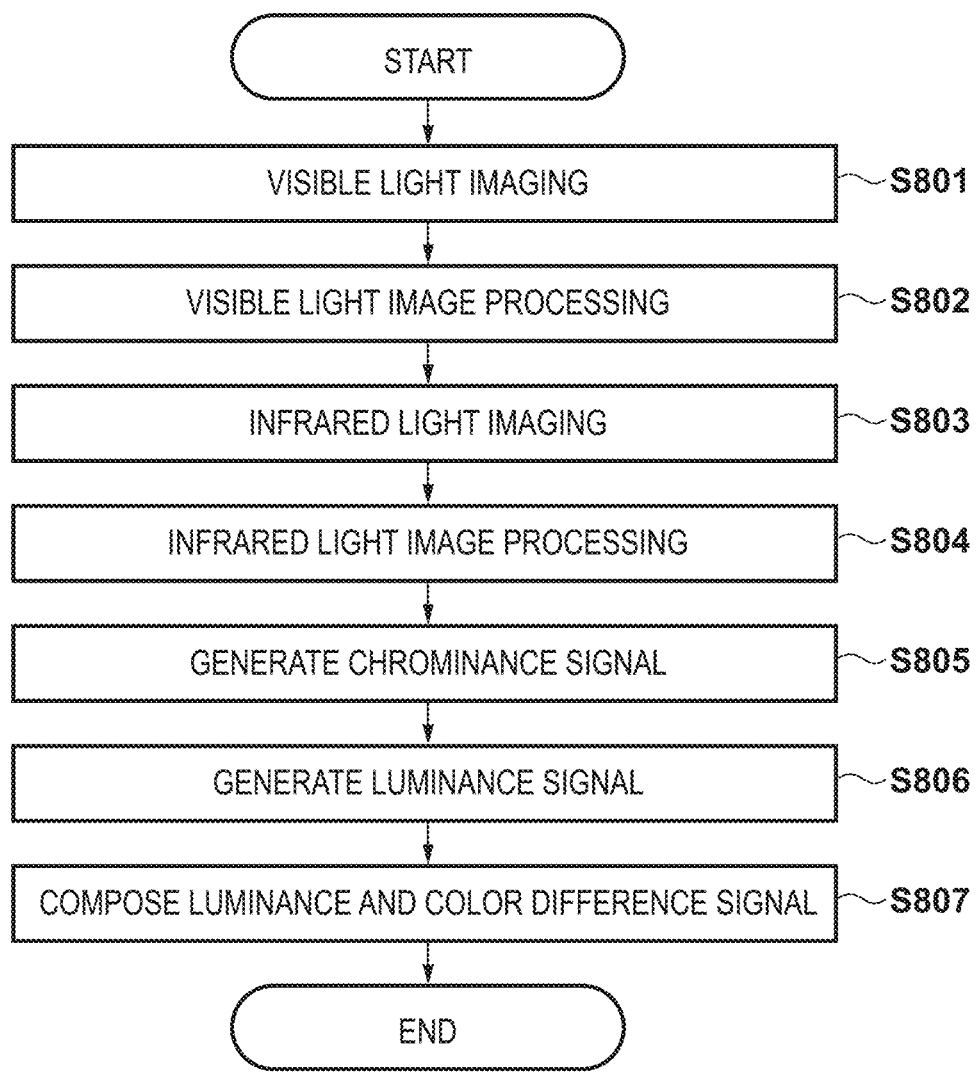
FIG. 8 is a flowchart illustrating a process performed by an image processing unit according to the second embodiment.

An operation of the image processing unit 50 according to the second embodiment will be described, referring to the flowchart of FIG. 8. The processing at steps S801 to S804 is similar to that of the first embodiment (S601 to S604 of FIG. 6). At S805, the chrominance signal generation unit 506 generates a composed chrominance signal from the chrominance signal generated in the visible light image processing unit 502. The composed chrominance signal may be a chrominance signal generated in the visible light image processing unit 502, or may be a corrected chrominance signal as described in the first embodiment (S606). At S806, the luminance signal generation unit 505 generates a luminance signal of the composite image using the luminance signal of the visible light image generated in the visible light image processing unit 502 and the luminance signal of the infrared light image generated in the infrared light image processing unit 504. On this occasion, the luminance signal generation unit 505 corrects the luminance signal of the composite image based on the chrominance information from the chrominance signal generation unit 506.

Note that, in a state where a large gain is applied due to low illuminance, largely correcting the luminance according to Formula 4 may result in emphasizing luminance noise. Thus, at S806, the luminance signal generation unit 505 may set a limit on the correction amount depending on the gain. At S807, the composition processing unit 507 composes the luminance signal from the luminance signal generation unit 505 and the chrominance signal from the chrominance signal generation unit 506, and outputs the composed signal as the composite image.

As has been described above, according to each of the aforementioned embodiments, correcting the luminance signal or the chrominance signal in accordance with at least one of hue and saturation of the visible light image, allows for providing an image composed from an appropriate pair of luminance signal and chrominance signal in accordance with each color. As a result, it is possible to generate a composite image with appropriate color representation from a visible light image and an infrared light image.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-106511, filed Jun. 6, 2019, which is hereby incorporated by reference herein in its entirety.

What is claimed is:

1. An image processing apparatus comprising:
at least one processor and/or circuit configured to function as following units
an obtaining unit configured to obtain a visible light image and an infrared light image; and
a composition unit configured to generate a color component of a composite image using a color component of the visible light image, and generate a luminance component of the composite image using luminance components of the infrared light image and the visible light image, wherein
the composition unit corrects the color component or the luminance component of the composite image, using a correction coefficient determined based on the color component of the visible light image,
the color component of the visible light image includes information of hue and saturation, and the correction coefficient is determined based on the hue or the saturation of the visible light image, and
the composition unit corrects the saturation of the composite image using a correction coefficient which becomes larger for a hue with a larger proportion of red or blue components compared to green components.

2. The image processing apparatus according to claim 1, wherein the composition unit corrects the color component of the composite image further based on a composition ratio of the luminance components of the visible light image and the infrared light image.

3. The image processing apparatus according to claim 1, further comprising a correction data table holding the correction coefficient in accordance with hue or saturation.

4. The image processing apparatus according to claim 1, wherein the composition unit corrects the saturation of the composite image using a correction coefficient which becomes larger for a larger difference or ratio between the luminance of the visible light image and the luminance of the infrared light image.

5. The image processing apparatus according to claim 1, wherein the composition unit corrects the saturation of the composite image using a correction coefficient which becomes smaller for a higher saturation of the visible light image.

6. The image processing apparatus according to claim 1, wherein the composition unit suppresses the saturation correction amount to a predetermined value or less when the saturation of the visible light image becomes higher than a predetermined value.

7. The image processing apparatus according to claim 1, wherein the composition unit corrects the luminance component of the composite image using a correction coefficient which becomes larger for a larger saturation.

8. An imaging apparatus comprising:
an image processing apparatus according to claim 1; and
an imaging unit configured to capture the visible light image and the infrared light image.

9. The imaging apparatus according to claim 8, wherein the imaging unit captures the visible light image and the infrared light image simultaneously and at a same angle of view.

10. An image processing apparatus comprising:
at least one processor and/or circuit configured to function as following units
an obtaining unit configured to obtain a visible light image and an infrared light image; and
a composition unit configured to generate a color component of a composite image using a color component of the visible light image, and generate a luminance component of the composite image using luminance components of the infrared light image and the visible light image, wherein
the composition unit corrects the color component or the luminance component of the composite image, using a correction coefficient determined based on the color component of the visible light image,
the color component of the visible light image includes information of hue and saturation, and the correction coefficient is determined based on the hue or the saturation of the visible light image, and
the composition unit corrects the luminance component of the composite image using a correction coefficient which becomes larger for a hue with a larger proportion of green components.

11. The image processing apparatus according to claim 10, wherein the composition unit suppresses the correction coefficient to a predetermined value or less to correct the luminance component of the composite image, in a case where a gain which is equal to or less than a predetermined value is being applied at the time of imaging.

12. An image processing method comprising:
obtaining a visible light image and an infrared light image; and
generating a color component of a composite image using a color component of the visible light image, and generating a luminance component of the composite image using luminance components of the infrared light image and the visible light image, wherein
the color component or the luminance component of the composite image is corrected using a correction coefficient determined based on the color component of the visible light image,
the color component of the visible light image includes information of hue and saturation, and the correction coefficient is determined based on the hue or the saturation of the visible light image, and
the saturation of the composite image is corrected using a correction coefficient which becomes larger for a hue with a larger proportion of red or blue components compared to green components.

13. A non-transitory computer-readable storage medium storing a program for causing a computer to perform an image processing method, the image processing method comprising:
obtaining a visible light image and an infrared light image; and
generating a color component of a composite image using a color component of the visible light image, and generating a luminance component of the composite image using luminance components of the infrared light image and the visible light image, wherein the color component or the luminance component of the composite image is corrected using a correction coefficient determined based the color component of the visible light image, the color component of the visible light image includes information of hue and saturation, and the correction coefficient is determined based on the hue or the saturation of the visible light image, and the saturation of the composite image is corrected using a correction coefficient which becomes larger for a hue with a larger proportion of red or blue components compared to green components.

\* \* \* \* \*